United States Patent [19]
Lukas

[11] Patent Number: 6,065,693
[45] Date of Patent: May 23, 2000

[54] FLOWERBED IRRIGATION SHOWER

[76] Inventor: John J. Lukas, 366 Franklin Ave., Ridgewood, N.J. 07450

[21] Appl. No.: 09/141,851

[22] Filed: Aug. 28, 1998

[51] Int. Cl.$^7$ ........................................................ B05B 1/14
[52] U.S. Cl. ........................... 239/548; 239/266; 239/267; 239/268; 239/269; 239/273; 239/282; 239/550; 239/565; 239/587.4
[58] Field of Search ..................................... 239/266, 267, 239/268, 269, 273, 282, 283, 450, 548, 550, 565, 566, 587.4

[56] References Cited

U.S. PATENT DOCUMENTS

| | | |
|---|---|---|
| 4,760,961 | 8/1988 | Nagai . |
| 4,919,336 | 4/1990 | Hudon et al. . |
| 5,121,882 | 6/1992 | Skidmore . |
| 5,740,970 | 4/1998 | Edwards . |

*Primary Examiner*—Andres Kashnikow
*Assistant Examiner*—Robin O. Evans
*Attorney, Agent, or Firm*—Terrance L. Siemens

[57] ABSTRACT

A spray shower apparatus reconfigurable and adjustable for watering flowers and other plants planted in beds. The apparatus comprises a kit enabling modular assembly and enclosed within a common enclosure. The principal component of the kit is a rigid liquid conduit having at least one threaded end and a plurality of orifices disposed on the lateral wall of the conduit. The conduit has a plurality of spray nozzles attachable to the orifices of the liquid conduit. Each spray nozzle is adjustable as to direction of spray relative to the liquid conduit. Other components of the kit include a connector for connecting the liquid conduit to an external source of liquid, brackets for securing the liquid conduit to a vertical environmental surface, and an end cap for closing the distal end of the liquid conduit. Preferably, components are provided in quantities enabling a plurality of liquid conduits to be arranged in series. Other components of the kit include a tee connector to accommodate branched arrangement of plural liquid conduits, a connector nipple enabling abutting connection of adjacent liquid conduits, threaded hose adapter fitting for connecting the liquid conduit to a garden hose or other source of liquid, and an adapter for enabling adjacent liquid conduits to be connected by slipping a garden hose over each.

9 Claims, 3 Drawing Sheets

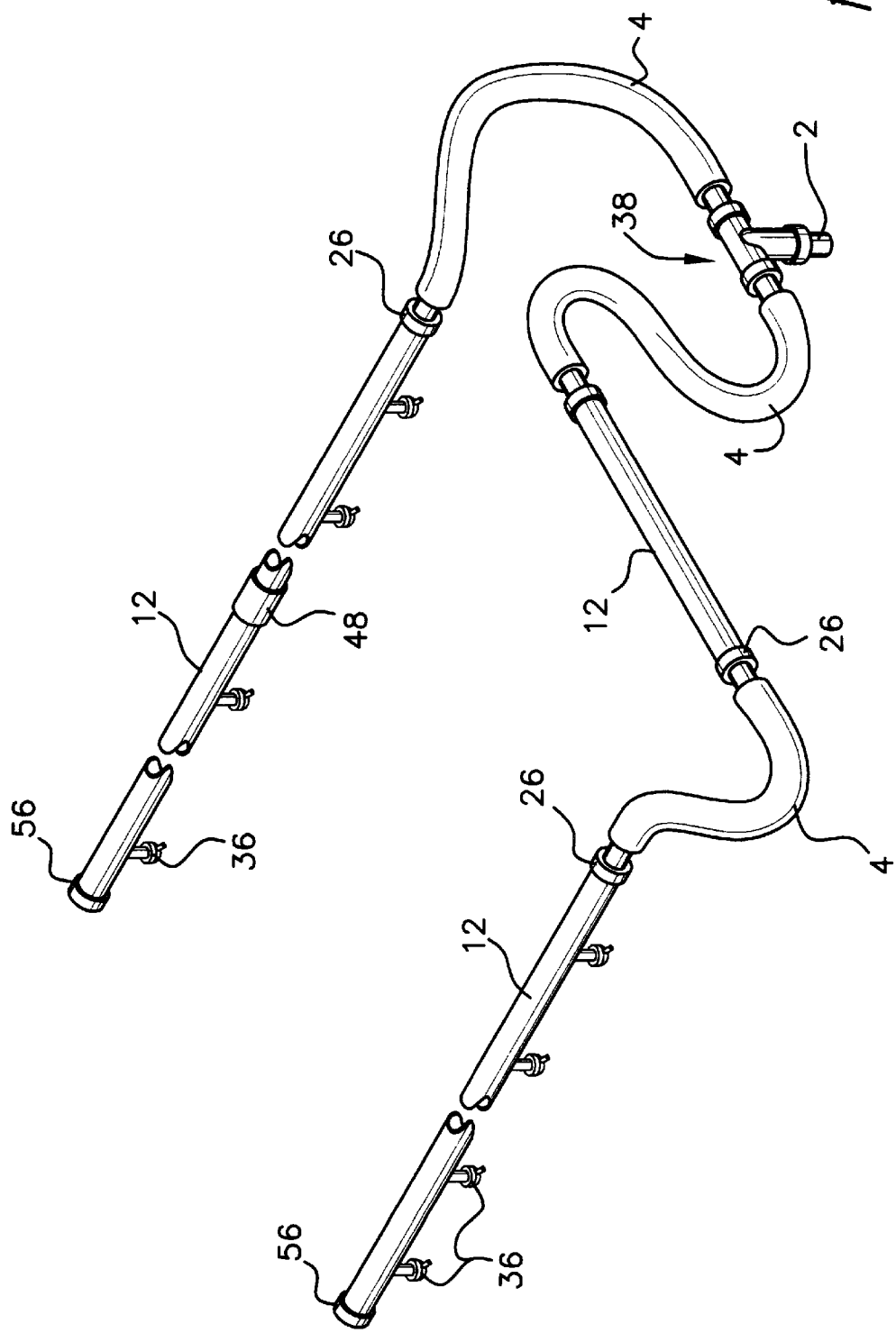

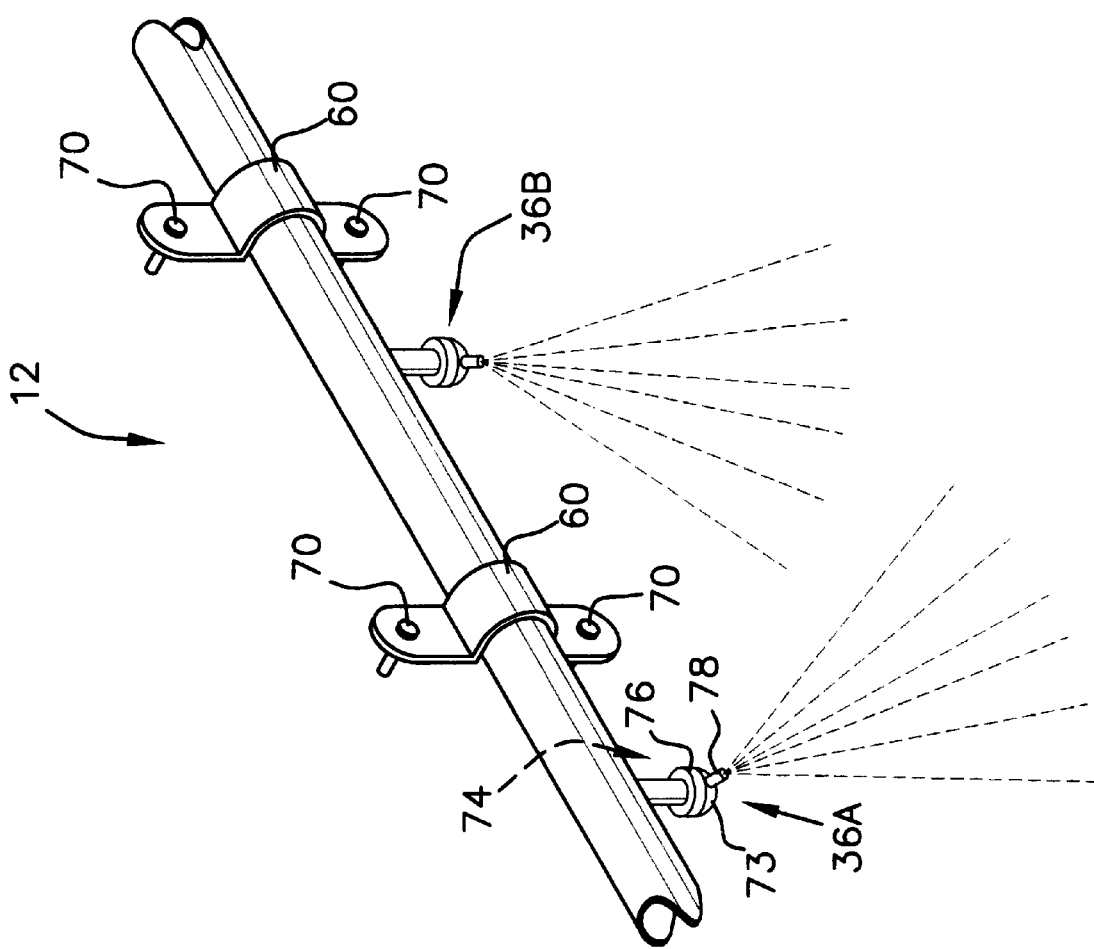

FLOWERBED IRRIGATION SHOWER

BACKGROUND OF THE INVENTION

1. Field of the Invention

The present invention relates to liquid dispensing apparatus, and more particularly to apparatus adapted to be mounted on a vertical surface and provided with plural discharge outlets for distributing a liquid in a selected discharge pattern.

2. Description of the Prior Art

Many houses and other residential and commercial buildings are decorated with flowers and other ornamental plants planted around the periphery of the building. Plants must frequently be watered to supplement naturally available water from precipitation. The prior art has proposed various sprinkling type irrigation systems to answer this need. It will be appreciated that decorative plants vary greatly in their nature, species, growth rate, stage of development, and in other ways affecting overall water requirements. Therefore, to be effective, an irrigation system suitable for watering flower beds and the like located at the periphery of a building must be able to accommodate different water needs at different locations.

U.S. Pat. No. 4,760,961, issued to Masahi Nagai on Aug. 2, 1988, describes an industrial spraying apparatus adapted to vary direction and location of spray heads. Unlike the present invention, variation of spray characteristics is limited by initial configuration of the water supply manifold. Location of spray heads in Nagai is varied, but configuration of the water supply manifold is predetermined and invariable. By contrast, the present invention may be configured to suit, and is provided with structure enabling mounting to a vertical environmental surface. In a further departure from Nagai, individual spray heads or nozzles in the present invention are individually adjustable as to flow rate.

U.S. Pat. No. 5,121,882, issued to Milus R. Skidmore on Jun. 16, 1992, sets forth a ground mounted misting apparatus having multiple spray nozzles. However, the specific application of Skidmore neither requires nor teaches the reconfigurable nature and individually adjustable nozzles of the present invention. Skidmore lacks ability to mount on a vertical surface.

U.S. Pat. No. 4,919,336, issued to James D. Hudon et al. on Apr. 24, 1990, describes shower pipes each including a plurality of spray nozzles. However, Hudon et al. lacks reconfigurably connected components and individually adjustable nozzles, both of which are features of the present invention.

U.S. Pat. No. 5,740,970, issued to Tim L. Edwards on Apr. 21, 1998, shows nozzles capable of being individually shut off. However, variation of directional adjustment is not taught. And because the device of Edwards is intended for mounting to a display case, it lacks reconfigurably connected components, as seen in the present invention.

An adjustable nozzle suitable for incorporation into the invention is shown in prior art advertising literature, such as those available from Spraying Systems Company, of Wheaton, Ill. Such nozzles are general purpose, and do not teach the novel spraying apparatus.

None of the above inventions and patents, taken either singly or in combination, is seen to describe the instant invention as claimed.

SUMMARY OF THE INVENTION

The present invention is directed to a kit providing a spray shower apparatus which may be mounted on walls or other vertical environmental surfaces. The kit includes components enabling variation in configuration of the final assembled apparatus, so that it can project sprayed liquid as desired. Moreover, the apparatus includes individual spray nozzles each of which is adjustable as to direction. By this combination of features, a spray shower apparatus may be assembled and configured to provide appropriate irrigation for many different layouts, plant types and heights, and other characteristics of flower and garden beds. Spray characteristics may be locally varied to suit plants at each point along the path served by the assembled spray shower apparatus.

To these ends, the invention includes rigid sections of conduit each provided with a plurality of outlet orifices to serve individual spray nozzles mounted at each outlet orifice. Adapters and connectors enable plural rigid sections to be joined in lengths and angular alignments to suit. Flexible or resilient garden hoses may be employed to join adjacent rigid sections of conduit. This is a significant advantage, since it allows a person to utilize a garden hose which may have become unusable in the traditional manner. For example, threaded terminals of such hoses may become stripped or warped, and may no longer be serviceable for connection to other threaded devices. The hose itself may acquire leaks and kinks obstructing ordinary usage. These defective hoses may be cut to provide short connectors joining adjacent spray conduits assembled to form the novel spray apparatus.

A variety of connectors are provided in the kit so that a variety of slip-on and threaded connections are possible. In particular, connection of a flexible hose to a threaded conduit of different diameter is made possible. Some connectors enable branching of the rigid conduits. Other connectors enable continuous abutting connection of plural rigid conduits.

Individual spray nozzles are adjustable as to direction of discharge of spray. This characteristic accommodates almost every variation in height, spacing, and fullness of individual plants.

Brackets are provided for mounting the rigid conduits to foundation walls, fence posts, or any vertical surface. The assembled spray apparatus may therefore be located above ground level, where it is protected from activities such as digging, cutting and trimming of grass, and the like.

The invention is preferably provided as a kit providing a quantity of each type of component in numbers and variety assuring that a purchaser will be able to assemble the apparatus in a selected configuration from the kit. That is, a reasonable number and variety of components are provided so that a suitable spray apparatus can be assembled without obliging the user to acquire additional components individually. In view of the many variations required for flower and garden beds of different lengths, arrangements, and proximity to one another, it is contemplated that kits having different numbers of components will be made commercially available. At a minimum, however, it is contemplated that insufficient components will be provided to assemble a novel spray apparatus extending the length of a typical residential dwelling.

Accordingly, it is one object of the invention to provide a spray apparatus which can be varied in its configuration.

It is another object of the invention to provide connectors enabling incorporation of flexible garden hoses in assembling the novel spray apparatus.

It is a further object of the invention to enable the spray apparatus to be mounted on vertical environmental surfaces.

Still another object of the invention is to accommodate and prolonged extension of individual rigid conduits by threaded connection.

An additional object of the invention is to accommodate branching of the principal conduits.

Yet another object of the invention is to provide a kit offering components in sufficient number and variation to assure that a suitably configured spray apparatus may be assembled without requiring individual acquisition of additional components.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, aid attendant advantages of the present invention will become more fully appreciated as the same becomes better understood when considered in conjunction with the accompanying drawings, in which like reference characters designate the same or similar parts throughout the several views, and wherein:

FIG. 2 is a diagrammatic, perspective view of a representative spray shower system assembled from the kit of FIG. 1.

FIG. 3 is an environmental, perspective detail view of an assembled representative spray shower system, illustrating adjustment of angle of spray.

DETAILED DESCRIPTION OF THE PREFERRED EMBODIMENTS

Figure 1:
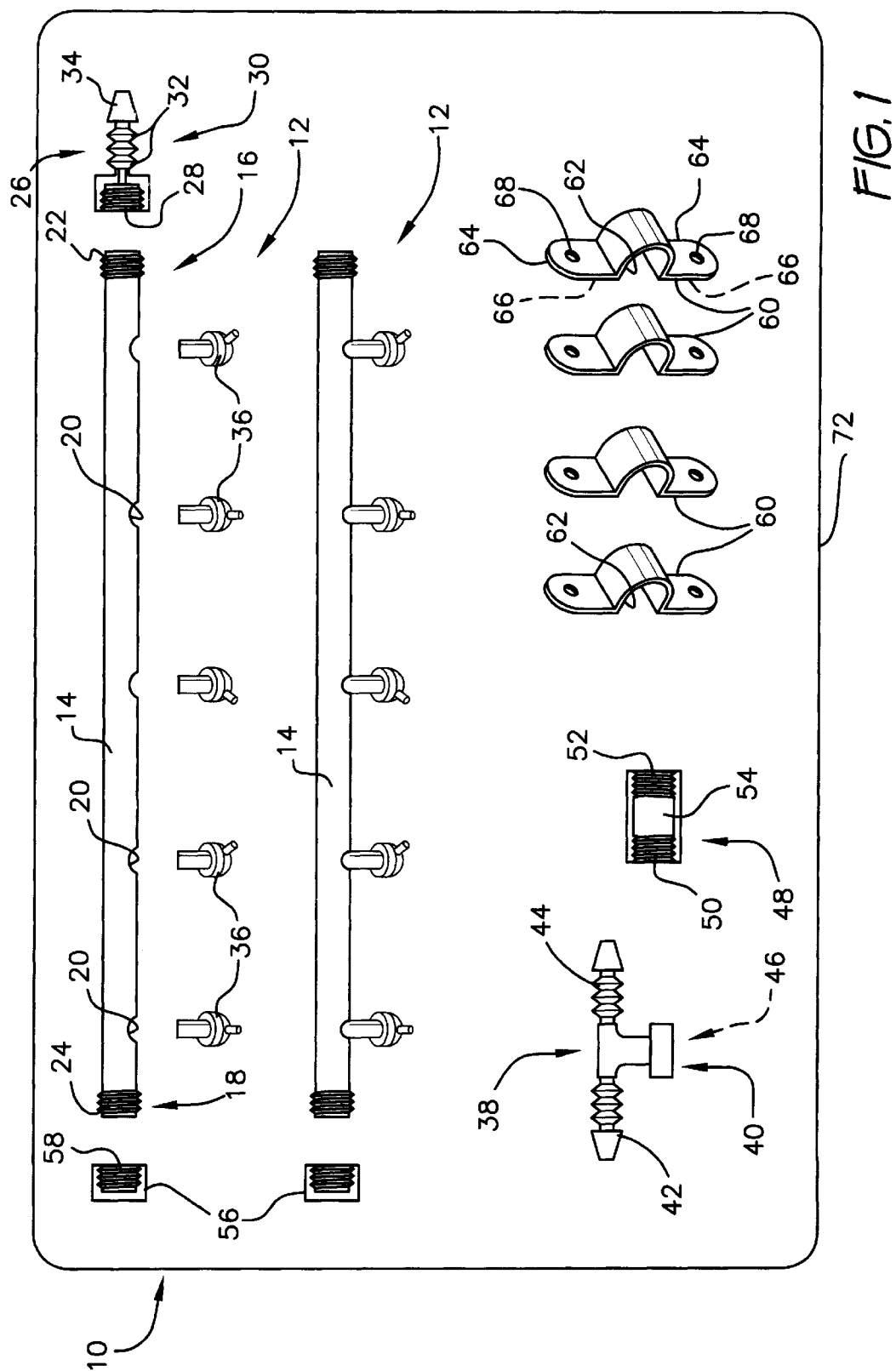
FIG. 1 is a diagrammatic plan view of the invention in the form of a kit.

FIG. 1 of the drawings shows novel spray shower apparatus 10 as individual components of a kit. Components of the kit will be described, with the understanding that the kit may comprise any selected quantity of any given component. The principal component is a liquid conduit 12 having a lateral wall 14, a proximal end 16, a distal end 18, and a plurality of outlet orifices 20 formed in lateral wall 14. Liquid conduit 12 is hollow, having an internal passage extending from proximal end 16 to distal end 18, the internal passage communicating with and supplying liquid to each outlet orifice 20. Proximal and distal ends 16, 18 each bear respective threads 22, 24. Threads 22, 24 are preferably similar, so that threads of another component of the kit mating with threads 22 are also compatible with threads 24. Conduit 20 is preferably rigid and tubular, and serves both as a supply manifold for conducting liquid from an external source (not shown) of liquid under pressure to each outlet orifice 20 and also as a conduit conducting liquid to subsequent liquid conduits 12.

Liquid conduit 12 is connected to the external source of liquid by a supply connector 26, which has threads 28 enabling removable manual connection to threads 22, and structure for connecting to a conduit associated with the external source of liquid. In the embodiment depicted in FIG. 1, this structure is a slip-on connector 30 having external, circumferential ribs 32 which frictionally engage and retain a flexible or elastic hose (not shown), such as an ordinary garden hose which may be connected to a spigot (not shown) of a domestic water supply. A frustoconical first rib 34 is provided, with pitch of its external surface arranged to encourage installation of a hose thereover, and to oppose spontaneous disengagement of the hose. Of course, slip-on connector 30 may alternatively comprise a threaded socket (not shown) for enabling threaded connection to a threaded terminal of a garden hose, if desired. Several connectors 26 may be provided so that one connector 26 connects a liquid conduit 12 to its associated liquid supply, with other connectors 26 serving as hose adapter fittings enabling serial connection of plural liquid conduits 12 by flexible hoses (see FIG. 2).

A plurality of spray nozzles 36 is provided, with at least one spray nozzle 36 being furnished for each outlet orifice 20. Each spray nozzle 36 is dimensioned and configured to attach to an outlet orifice 20, and has structure such as threads, grooves, or the like (none shown) enabling removable manual connection to conduit 12. Each spray nozzle 36 has structure for adjusting direction of liquid sprayed relative to liquid conduit 12. This may be accomplished, for example, by incorporating a ball and socket joint enabling swiveling of the discharge conduit of spray nozzle 36 within the socket.

Various connectors are provided to enable connection of plural liquid conduits 12 to one another in series or in branching manner. A tee connector 38 enables branched connection of three liquid conduits 12. Supply connector 26 is a two way fitting having two ends and no other ends, whereas tee connector 38 is a three way fitting having three ends. Connector 38 has a threaded terminal 40 and two slip-on terminals 42, 44. Terminal 40 is essentially similar in nature to that of supply connector 26, bearing internal threads 46 compatible with threads 22, 24 of liquid conduit 12. Slip-on terminals 42, 44 are essentially similar to that of slip-on connector 30. Connector 38 has an internal passage (not shown) communicating among terminals 40, 42, 44.

A connector nipple 48 is provided to enable rigid connection of one liquid conduit 12 to another liquid conduit 12. Connector nipple 48 has threads 50, 52 each capable of mating with threads 22, 24 of liquid conduit 12. Nipple 48 has an internal passage 54 for conducting liquid from one liquid conduit 12 to the next liquid conduit 12.

An end cap 56 is provided to close each conduit 12, to prevent loss of liquid pressure in operation. Each end cap 56 has threads 58 mating with threads 22, 24 of liquid conduit 12. End cap 56 is dimensioned and configured to seal proximal and distal ends 16, 18 of a liquid conduit 12, and to be manually and releasably attached a liquid conduit 12.

A plurality of brackets 60 are provided to engage liquid conduits 12, for the purpose of mounting the same to any convenient flat environmental surface (not shown). Each bracket 60 is dimensioned and configured to cooperate with and retain a liquid conduit 12. In the embodiment of FIG. 1, a partially circular channel 62 corresponding to the outer configuration of wall 14 of liquid conduit 12 enables close fit of conduit 12 within bracket 60. Each bracket 60 has tabs 64 projecting therefrom. Tabs 64 each have flat surfaces 66 for mounting to the environmental surface, and holes 68 for accepting fasteners 70 (see FIG. 3) which secure bracket 60 to the environmental surface.

The above components are enclosed and retained within a suitable enclosure 72, such as a corrugated paper box, a plastic case or bag, or other device suitable for storage, display, and retail distribution.

FIG. 2 illustrates a representative assembled spray shower apparatus assembled from the components described above. A source of supply of liquid is indicated at 2. This source of supply may be a garden hose connected to a domestic water supply, the spigot of the domestic water supply, or any other suitable source. Source 2 is connected to tee connector 38, so that two diverging branches are supplied with liquid from one source. Two hose sections 4 are slipped over the terminals of tee connector 38, each hose section 4 serving a different branch of the assembled system. One branch includes two liquid conduits 12 connected by an additional flexible hose section 4. Supply connectors 26 are employed to adapt hose sections 4 to the respective liquid conduits 12. The other branch includes two liquid conduits 12 connected rigidly to one another by a connector nipple 48. The last liquid conduit 12 in each branch is closed by a respective end cap 56. Spray nozzles 36 may be adjusted as to direction of spray after liquid conduits are in place and secured to an environmental surface.

FIG. 3 illustrates a liquid conduit 12 as it would be mounted to an environmental surface (not shown), and also illustrates adjustment of spray direction. Fasteners 70 are passed through holes 68 (see FIG. 1) formed in each bracket 60. Fasteners 70 may comprise screws, nails, or other fasteners which can engage tabs 64 of brackets 60. In the embodiment of FIG. 3, each nozzle 36 has a ball 73 which can swivel in its socket or base 74. Friction holding ball 73 in its selected position is applied by a cap 76 which screws to socket or base 74. The discharge conduit 78 of each nozzle 36 can be manually adjusted by causing it to point in a selected direction, within limits of motion of the ball and socket. Construction of nozzles 36 may be essentially similar to those available from Spraying Systems Company, of Wheaton, Ill., and thus need not be set forth in greater detail herein.

The present invention thus enables many different configurations to be realized from any one selection of components of the kit. The exact quantity, configuration, and dimensions of individual components may be varied to suit different applications. Slip-on connection structure may be changed to threaded or still other connection structure, if desired. Tee connectors may include angles other than the right angles depicted herein.

It is to be understood that the present invention is not limited to the embodiments described above, but encompasses any and all embodiments within the scope of the following claims.

I claim:

1. A spray shower apparatus connectable to an external source of liquid under pressure, for irrigating flower and garden plant beds, comprising:

a substantially rigid liquid conduit having a lateral wall, a proximal end having an inlet opening bearing threads, and a plurality of outlet orifices formed in said lateral wall;

a supply connector disposed to connect said liquid conduit to the external source of liquid, having a first end bearing threads enabling removable manual connection to said threads of said rigid liquid conduit, and a second end bearing external, circumferential ribs capable of frictionally engaging and retaining a flexible hose; and at least one exposed spray nozzle dimensioned and configured to attach to a said outlet orifice, said spray nozzle having means for manually adjusting direction relative to said liquid conduit of liquid sprayed from said spray nozzle, and said spray nozzle having an element retaining said spray nozzle in a fixed selected directional orientation by friction.

2. The spray shower apparatus according to claim 1, further comprising at least one bracket dimensioned and configured to cooperate with and retain said liquid conduit, said bracket having means for attaching to a vertical environmental surface.

3. The spray shower apparatus according to claim 2, wherein said apparatus includes a plurality of said liquid conduits, each said liquid conduit being rigid, wherein each said liquid conduit bears threads at its respective said proximal end, said spray shower apparatus further comprising a connector nipple having first threads mating with said threads of a said liquid conduit and second threads mating with said threads of a said liquid conduit.

4. The spray shower apparatus according to claim 3, wherein each said liquid conduit bears threads at its respective said proximal end, said spray shower apparatus further comprising a connector nipple having first threads mating with said threads of a said liquid conduit and second threads mating with said threads of a said liquid conduit.

5. The spray shower apparatus according to claim 3, wherein each said liquid conduit bears threads at its respective said proximal end, said spray shower apparatus further comprising a tee connector having threads mating with said threads of a said liquid conduit, a first terminal having means for engaging and retaining a flexible hose and a second terminal having external circumferential ribs capable of engaging and retaining a flexible hose, said tee connector having an internal passage communicating among said threads of said tee connector, said first terminal, and said second terminal.

6. The spray shower apparatus according to claim 1, further comprising an enclosure retaining said liquid conduit, said supply connector, and said spray nozzle together.

7. The spray shower apparatus according to claim 1, wherein said liquid conduit has a distal end, an opening located at said distal end such that said distal end of said liquid conduit communicates with said proximal end of said liquid conduit, and an end cap having means for manually and releaseably attaching to and sealing said distal end of said liquid conduit.

8. A spray shower apparatus connectable to an external source of liquid under pressure, for irrigating flower and garden plant beds, comprising:

a plurality of rigid liquid conduits each having a lateral wall, a proximal end having an inlet opening bearing first threads, a distal end having an outlet bearing second threads, and a plurality of outlet orifices formed in said lateral wall;

a plurality of exposed spray nozzles each dimensioned and configured to attach to a said outlet orifice, each said spray nozzle having means for manually adjusting direction relative to said liquid conduit of liquid sprayed from said spray nozzle, each said spray nozzle having an element remaining said spray nozzle in a fixed selected directional orientation by friction;

a plurality of brackets each dimensioned and configured to cooperate with and retain a said liquid conduit, each said bracket having means for attaching to a vertical environmental surface;

a connector nipple having first threads mating with said first threads of a said liquid conduit and second threads mating with said first threads of a said liquid conduit;

a three ended tee connector having threads mating with said threads of a said liquid conduit, a first terminal having external circumferential ribs dimensioned and configured to engage and retain a flexible hose and a second terminal having external circumferential ribs dimensioned and configured to engage and retain a flexible hose, said tee connector having an internal passage communicating among said threads of said tee connector, said first terminal, and said second terminal;

an end cap having threads mating with said second threads of a said liquid conduit, said end cap being dimensioned and configured to seal a said outlet of said distal end of a said liquid conduit;

a two ended threaded hose adapter fitting having a body, a passage having a proximal end and a distal end and no other ends, said passage extending entirely through said body, threads formed at said proximal end of said body, and external circumferential ribs capable of engaging and retaining a flexible hose to said distal end of said body, said liquid conduit bearing threads at said proximal end thereof, and said threads of said hose adapter fitting mating to said second threads of said liquid conduit; and an enclosure retaining said liquid conduits, said supply connector, said spray nozzles, said brackets, said connector nipples, said tee connector, said end cap, and said threaded hose adapter fitting together.

9. A kit of components for assembling a spray shower apparatus connectable to an external source of liquid under pressure, for irrigating flower and garden plant beds, said kit comprising:

a plurality of rigid liquid conduits each having a lateral wall, a proximal end having an inlet opening bearing first threads, a distal end having an outlet bearing second threads, and a plurality of outlet orifices formed in said lateral wall;

a plurality of exposed spray nozzles each dimensioned and configured to attach to a said outlet orifice, each said spray nozzle having means for manually adjusting direction relative to said liquid conduit of liquid sprayed from said spray nozzle, each said spray nozzle having an element retaining said spray nozzle in a fixed selected directional orientation by friction;

a plurality of end caps each having threads mating with said second threads of a said liquid conduit, each said end cap being dimensioned and configured to seal a said outlet of said distal end of a said liquid conduit;

at least one supply connector disposed to connect said liquid conduit to the external source of liquid, having a first end bearing threads enabling removable manual connection to said threads of said rigid liquid conduit, and a second end bearing external, circumferential ribs capable of frictionally engaging and retaining a flexible hose;

at least one connector nipple having threads capable of mating with said threads of said rigid liquid conduits;

a plurality of brackets each dimensioned and configured to cooperate with and retain said liquid conduit, each said bracket having means for attaching to a vertical environmental surface;

at least one flexible hose section;

at least one tee connector having a threaded terminal and two slip-on terminals; and an enclosure suitable for storage, display, and retail distribution, said enclosure enclosing said rigid liquid conduits, said spray nozzles, said end caps, said at least one supply connector, said at least one connector nipple, said plurality of brackets, said at least one flexible hose section, and said at least one tee connector.

* * * * *